(12) United States Patent
Flawn (10) Patent No.: US 9,916,064 B2
(45) Date of Patent: Mar. 13, 2018

(54) SYSTEM AND METHOD FOR TOGGLE INTERFACE

(71) Applicant: Rakuten Kobo, Inc., Toronto (CA)

(72) Inventor: Sarah Flawn, Toronto (CA)

(73) Assignee: RAKUTEN KOBO, INC., Toronto (CA)

(*) Notice: Subject to any disclaimer, the term of this patent is extended or adjusted under 35 U.S.C. 154(b) by 426 days.

(21) Appl. No.: 14/548,190

(22) Filed: Nov. 19, 2014

(65) Prior Publication Data
US 2016/0139751 A1    May 19, 2016

(51) Int. Cl.
| G06F 17/00 | (2006.01) |
| G06F 3/0483 | (2013.01) |
| G06F 3/0486 | (2013.01) |
| G06F 3/0484 | (2013.01) |
| G06F 17/30 | (2006.01) |
| G06F 3/0488 | (2013.01) |
| G06F 3/0482 | (2013.01) |

(52) U.S. Cl.
CPC .......... *G06F 3/0483* (2013.01); *G06F 3/0482* (2013.01); *G06F 3/0486* (2013.01); *G06F 3/0488* (2013.01); *G06F 3/04842* (2013.01); *G06F 17/30011* (2013.01)

(58) Field of Classification Search
CPC .................................................. G06F 3/0483
See application file for complete search history.

(56) References Cited

U.S. PATENT DOCUMENTS

| 7,243,299 | B1 * | 7/2007 | Rubin | G06F 3/0483 |
| | | | | 707/E17.116 |
| 9,063,637 | B2 * | 6/2015 | Lisse | G06F 3/0483 |
| 9,275,028 | B2 * | 3/2016 | Migos | G06F 17/241 |
| 9,423,932 | B2 * | 8/2016 | Kroupa | G06F 3/0483 |
| 2003/0120599 | A1 * | 6/2003 | Agboatwalla | G06F 17/30873 |
| | | | | 705/50 |
| 2008/0168073 | A1 | 7/2008 | Siegel et al. | |
| 2010/0218137 | A1 * | 8/2010 | Sim | G06F 3/0416 |
| | | | | 715/788 |
| 2013/0031208 | A1 * | 1/2013 | Linton | H04L 67/125 |
| | | | | 709/217 |
| 2014/0002351 | A1 | 1/2014 | Nakayama | |

(Continued)

FOREIGN PATENT DOCUMENTS

JP    2010-522935 A    7/2010

OTHER PUBLICATIONS

Hinckley et al., "Informal Information Gathering Techniques for Active Reading" CHI 2012, May 5-10, 2012, Austin, Texas, USA, p. 1893-1896.*

(Continued)

*Primary Examiner* — Amelia Tapp
(74) *Attorney, Agent, or Firm* — Oblon, McClelland, Maier & Neustadt, L.L.P.

(57) ABSTRACT

A method for providing a toggle interface on an electronic personal display is provided. In one embodiment, the method includes receiving a request to enter a toggle mode from a user, determining a first e-book content associated with the user, determining a second e-book content associated with the first e-book content; and directing the electronic personal display to open said second e-book content when initiating the toggle mode.

4 Claims, 8 Drawing Sheets

(56) References Cited

U.S. PATENT DOCUMENTS

| | | | |
|---|---|---|---|
| 2014/0358773 A1* | 12/2014 | Lerner | G06Q 40/00 705/39 |
| 2015/0015487 A1 | 1/2015 | Nakayama | |
| 2015/0177933 A1* | 6/2015 | Cueto | G06F 3/0483 715/776 |
| 2015/0324074 A1* | 11/2015 | Van Winkle | G06F 3/0483 715/776 |
| 2016/0041700 A1* | 2/2016 | Beavers | G06F 3/0483 715/838 |

OTHER PUBLICATIONS

International Search Report and Written Opinion of the International Searching Authority dated Jan. 12, 2016 in PCT/JP2015/005797.

* cited by examiner

```
DETERMINING A FIRST HIGHLIGHTED PORTION OF A FIRST
E-BOOK CONTENT ASSOCIATED WITH THE USER
402
```

```
DETERMINING A SECOND E-BOOK CONTENT ASSOCIATED WITH THE FIRST E-
BOOK CONTENT
404
```

```
DIRECTING THE ELECTRONIC PERSONAL DISPLAY TO OPEN A SECOND
HIGHLIGHTED PORTION OF THE SECOND E-BOOK CONTENT
406
```

```
PROVIDING A POP UP WINDOW FOR CONTAINING THE SECOND
HIGHLIGHTED PORTION OF THE SECOND E-BOOK CONTENT
408
```

```
┌─────────────────────────────────────────────┐
│ RECEIVING A REQUEST TO ENTER A TOGGLE MODE FROM │
│                    A USER                      │
│                     502                        │
└─────────────────────────────────────────────┘
                      ↓
┌─────────────────────────────────────────────┐
│ DETERMINING A FIRST E-BOOK CONTENT ASSOCIATED WITH THE USER │
│                     504                        │
└─────────────────────────────────────────────┘
                      ↓
┌─────────────────────────────────────────────┐
│ DETERMINING A SECOND E-BOOK CONTENT ASSOCIATED WITH THE FIRST E- │
│                   BOOK CONTENT                 │
│                     506                        │
└─────────────────────────────────────────────┘
                      ↓
┌─────────────────────────────────────────────┐
│ DIRECTING THE ELECTRONIC PERSONAL DISPLAY TO OPEN THE SECOND E- │
│        BOOK CONTENT WHEN INITIATING THE TOGGLE MODE │
│                     508                        │
└─────────────────────────────────────────────┘
                      ↓
┌─────────────────────────────────────────────┐
│ MOVING THE FIRST E-BOOK CONTENT FROM A PRIMARY PORTION OF THE │
│  ELECTRONIC PERSONAL DISPLAY TO A SECONDARY PORTION OF THE │
│            ELECTRONIC PERSONAL DISPLAY         │
│                     510                        │
└─────────────────────────────────────────────┘
```

_SYSTEM AND METHOD FOR TOGGLE INTERFACE_

TECHNICAL FIELD

Examples described herein relate to a system and method for a toggle interface.

BACKGROUND

An electronic personal display is a mobile computing device that displays information to a user. While an electronic personal display may be capable of many of the functions of a personal computer, a user can typically interact directly with an electronic personal display without the use of a keyboard that is separate from, or coupled to, but distinct from the electronic personal display itself. Some examples of electronic personal displays include mobile digital devices/tablet computers and electronic readers (e-readers) such (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, Kobo Aura H2O, Kobo GLO and the like).

Some electronic personal display devices are purpose built devices designed to perform especially well at displaying digitally stored content for reading or viewing thereon. For example, a purpose build device may include a display that reduces glare, performs well in high lighting conditions, and/or mimics the look of text as presented via actual discrete pages of paper. While such purpose built devices may excel at displaying content for a user to read, they may also perform other functions, such as displaying images, emitting audio, recording audio, and web surfing, among others.

Electronic personal displays are among numerous kinds of consumer devices that can receive services and utilize resources across a network service. Such devices can operate applications or provide other functionality that links a device to a particular account of a specific service. For example, the electronic reader (e-reader) devices typically link to an online bookstore, and media playback devices often include applications that enable the user to access an online media electronic library (or e-library). In this context, the user accounts can enable the user to receive the full benefit and functionality of the device.

Yet further, such devices may incorporate a touch screen display having integrated touch sensors and touch sensing functionality, whereby user input commands via touch-based gestures are received thereon.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIGS. 3_a_, 3_b_ and 3_c_ illustrate exemplary display operations for toggling a plurality of e-Book content, according to an embodiment.

DETAILED DESCRIPTION

A method for providing a toggle interface on an electronic personal display is provided. In one embodiment, the method includes receiving a request to enter a toggle mode from a user, determining a first e-book content associated with the user, determining a second e-book content associated with the first e-book content; and directing the electronic personal display to open said second e-book content when initiating the toggle mode.

Embodiments also include a cross-referencing annotation and toggle interface that enhances users' digital reading experience by making multiple e-book source texts simultaneously available and easily navigable through a toggle interface activated from the home screen and controlled by intuitive touch and drag gestures, enabling readers to move effortlessly between different books (up to a maximum of four) for the purpose of cross-referencing, comparative analysis, linking to supplemental information etc.

In one embodiment, annotation links, both cross-sources and inter-source, can be created by highlighting a specific term, sentence, image, word, or section of one text and thereby connect it to another source text, creating text preview bubbles as well as user-composed annotations.

In one embodiment, the text preview bubbles (with hide (X) option) link to specific places within the secondary reference source or inter-textually within a given source text, depending on what option the user has selected via highlighting.

In one embodiment, a user may also create cross-source or inter-source textual links with their own annotations. A toggle interface on the display screen allows readers to quickly move back and forth between multiple reference sources/e-books.

Embodiments also include a network structure of relations between multiple texts, as well as within any given text, can be created in order to maximize, organize, and facilitate a multi-source reading experience, whether for academic purposes or for quick and easy cross-referencing. For example, in academic context, embodiments described herein allow for easy cross-textual analysis and comparison, as well as academic secondary references in order to better understand a primary text.

Figure 3A:
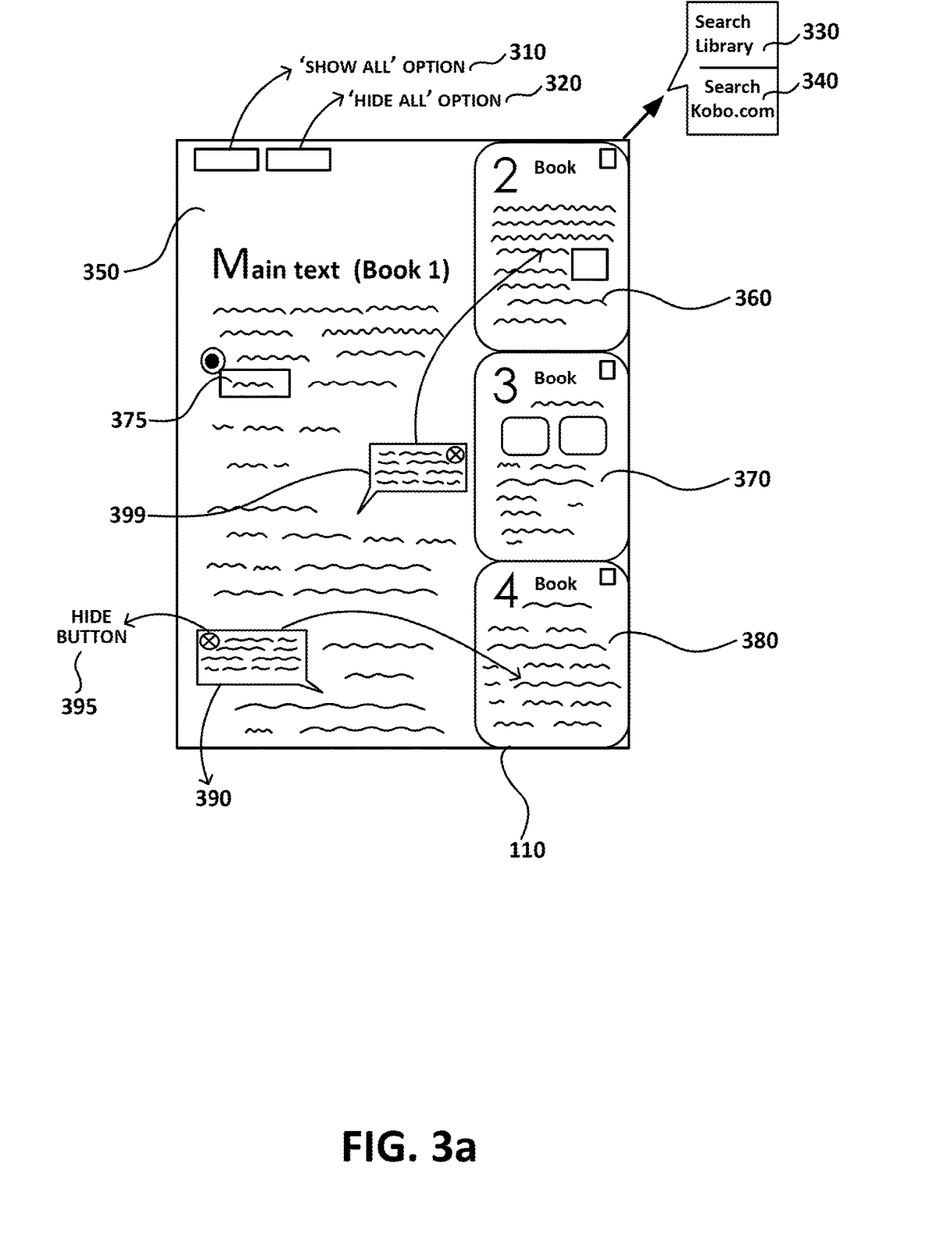
Figure 3B:
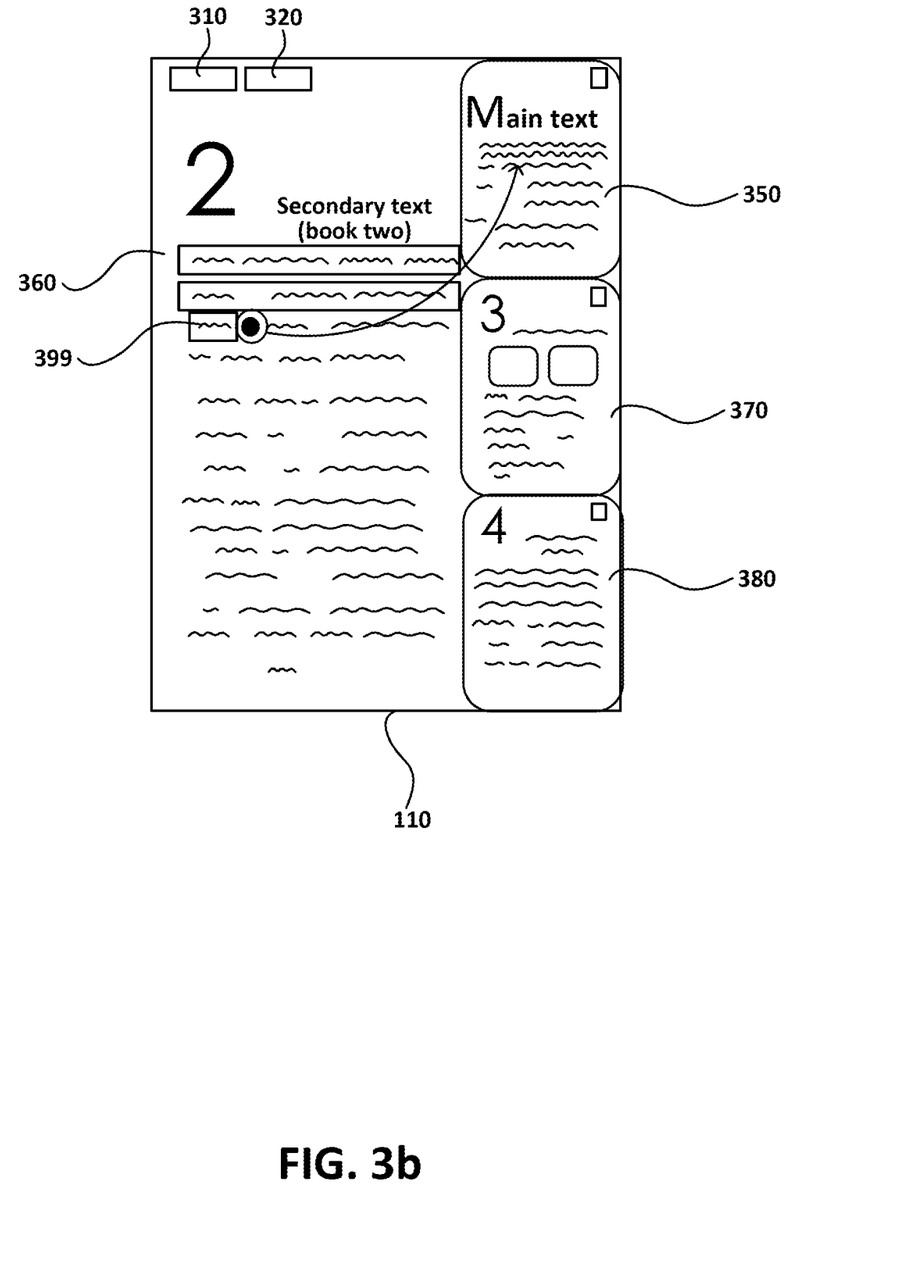
Figure 3C:
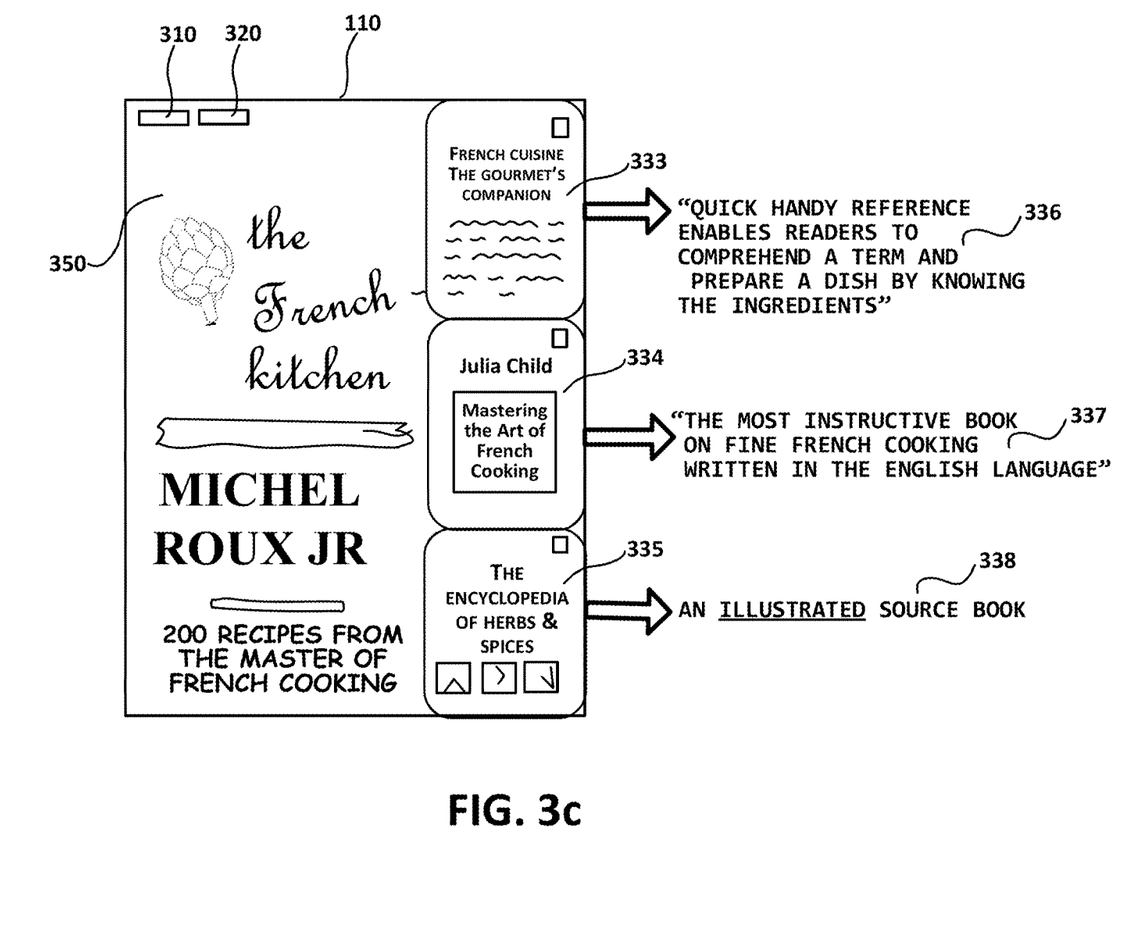

Other embodiments include allowing for easy references between a selected number of books (say 2-4?) to broaden the scope on a particular subject or activity (see French cookbook example described in FIG. 3_c_).

Overview of E-Books

"E-books" are a form of electronic publication content stored in digital format in a computer non-transitory memory, viewable on a computing device having display functionality. An e-book can correspond to, or mimic, the paginated format of a printed publication for viewing, such as provided by printed literary works (e.g., novels) and periodicals (e.g., magazines, comic books, journals, etc.). Optionally, some e-books may have chapter designations, as well as content that corresponds to graphics or images (e.g., such as in the case of magazines or comic books).

Multi-function devices, such as cellular-telephony or messaging devices, can utilize specialized applications (e.g., specialized e-reading application software) to view e-books in a format that mimics the paginated printed publication. Still further, some devices (sometimes labeled as "e-readers") can display digitally-stored content in a more reading-centric manner, while also providing, via a user input interface, the ability to manipulate that content for viewing, such as via discrete pages arranged sequentially (that is, pagination) corresponding to an intended or natural reading progression, or flow, of the content therein.

An "e-reading device", variously referred to herein as an electronic personal display or mobile computing device, can refer to any computing device that can display or otherwise render an e-book. By way of example, an e-reading device can include a mobile computing device on which an e-reading application can be executed to render content that includes e-books (e.g., comic books, magazines, etc.). Such mobile computing devices can include, for example, a multi-functional computing device for cellular telephony/messaging (e.g., feature phone or smart phone), a tablet computer device, an ultra-mobile computing device, or a wearable computing device with a form factor of a wearable accessory device (e.g., smart watch or bracelet, glass-wear integrated with a computing device, etc.). As another example, an e-reading device can include an e-reader device, such as a purpose-built device that is optimized for an e-reading experience (e.g., with E-ink displays).

Figure 1:
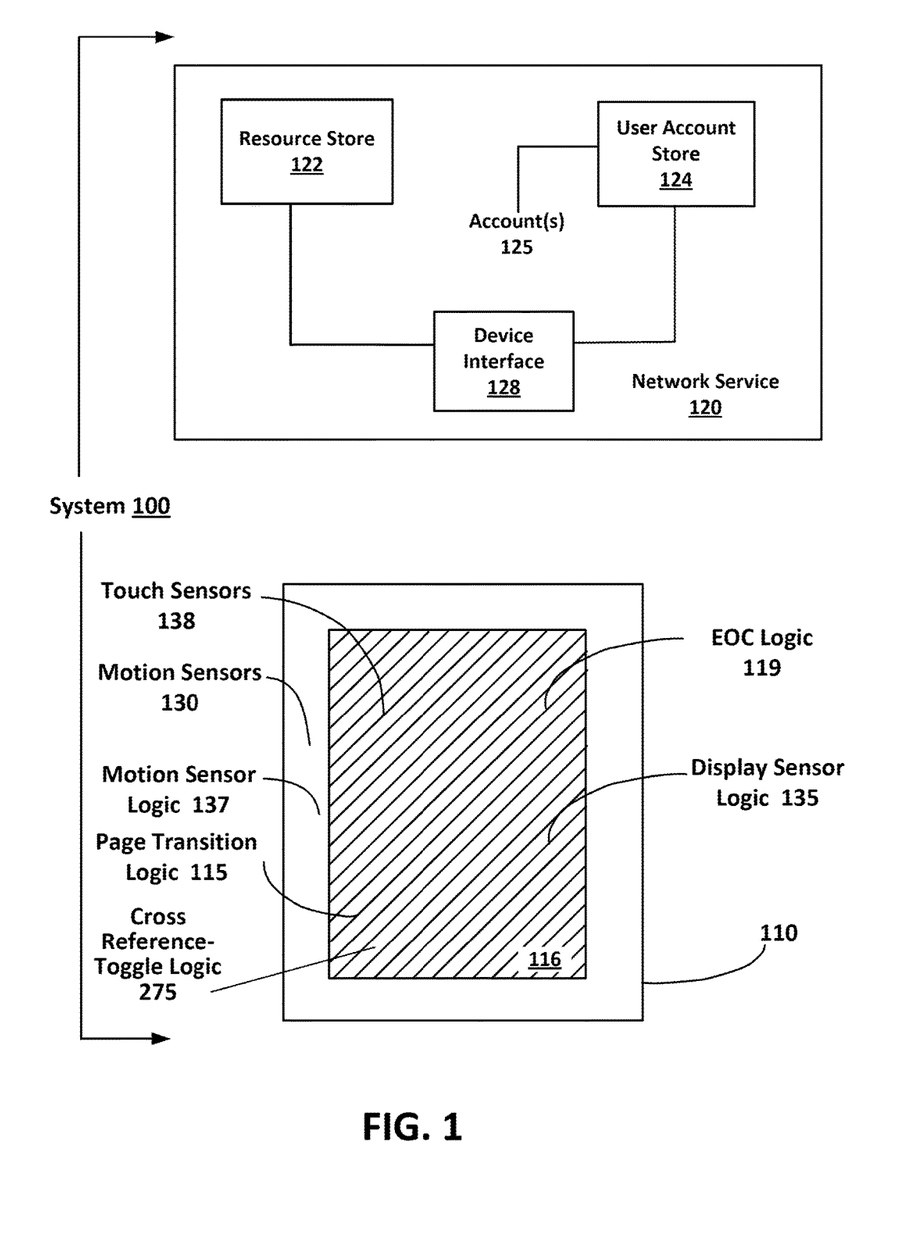
FIG. 1 illustrates a system utilizing applications and providing e-book services on a computing device configured for implementing an image centric mobile application, in an embodiment.

FIG. 1 illustrates a system 100 for utilizing applications and providing e-book services on a computing device, according to an embodiment. In an example of FIG. 1, system 100 includes cross reference and toggle logic 275 for providing a content toggle and cross referencing platform that enables media discovery. In one embodiment, the cross reference and toggle logic 275 enhances users' digital reading experience by making multiple e-book source texts simultaneously available and easily navigable through a toggle interface activated from the home screen and controlled by intuitive touch and drag gestures, enabling readers to move effortlessly between different books (up to a maximum of four) for the purpose of cross-referencing, comparative analysis, linking to supplemental information etc.

In one embodiment, the text preview bubbles (with hide (X) option) link to specific places within the secondary reference source or inter-textually within a given source text, depending on what option the user has selected via highlighting.

In one embodiment, a user may also create cross-source or inter-source textual links with their own annotations. The cross reference and toggle logic 275 allows readers to quickly move back and forth between multiple reference sources/e-books.

System 100 includes an electronic personal display device, shown by way of example as an e-reading device 110, and a network service 120. The network service 120 can include multiple servers and other computing resources that provide various services in connection with one or more applications that are installed on the e-reading device 110. By way of example, in one implementation, the network service 120 can provide e-book services that communicate with the e-reading device 110. The e-book services provided through network service 120 can, for example, include services in which e-books are sold, shared, downloaded and/or stored. More generally, the network service 120 can provide various other content services, including content rendering services (e.g., streaming media) or other network-application environments or services.

The e-reading device 110 can correspond to any electronic personal display device on which applications and application resources (e.g., e-books, media files, documents) can be rendered and consumed. For example, the e-reading device 110 can correspond to a tablet or a telephony/messaging device (e.g., smart phone). In one implementation, for example, e-reading device 110 can run an e-reader application that links the device to the network service 120 and enables e-books provided through the service to be viewed and consumed. In another implementation, the e-reading device 110 can run a media playback or streaming application that receives files or streaming data from the network service 120. By way of example, the e-reading device 110 can be equipped with hardware and software to optimize certain application activities, such as reading electronic content (e.g., e-books). For example, the e-reading device 110 can have a tablet-like form factor, although variations are possible. In some cases, the e-reading device 110 can also have an E-ink display.

In additional detail, the network service 120 can include a device interface 128, a resource store 122 and a user account store 124. The user account store 124 can associate the e-reading device 110 with a user and with an account 125. The account 125 can also be associated with one or more application resources (e.g., e-books), which can be stored in the resource store 122. The device interface 128 can handle requests from the e-reading device 110, and further interface the requests of the device with services and functionality of the network service 120. The device interface 128 can utilize information provided with a user account 125 in order to enable services, such as purchasing downloads or determining what e-books and content items are associated with the user device. Additionally, the device interface 128 can provide the e-reading device 110 with access to the content store 122, which can include, for example, an online store. The device interface 128 can handle input to identify content items (e.g., e-books), and further to link content items to the account 125 of the user.

Yet further, the user account store 124 can retain metadata for individual accounts 125 to identify resources that have been purchased or made available for consumption for a given account. The e-reading device 110 may be associated with the user account 125, and multiple devices may be associated with the same account. As described in greater detail below, the e-reading device 110 can store resources (e.g., e-books) that are purchased or otherwise made available to the user of the e-reading device 110, as well as to archive e-books and other digital content items that have been purchased for the user account 125, but are not stored on the particular computing device.

With reference to an example of FIG. 1, e-reading device 110 can include a display screen 116 and an optional housing, not shown. In an embodiment, the display screen 116 is touch-sensitive, to process touch inputs including gestures (e.g., swipes). For example, the display screen 116 may be integrated with one or more touch sensors 138 to provide a touch-sensing region on a surface of the display screen 116. For some embodiments, the one or more touch sensors 138 may include capacitive sensors that can sense or detect a human body's capacitance as input. In the example of FIG. 1, the touch sensing region coincides with a substantial surface area, if not all, of the display screen 116.

Additionally, the housing can be integrated with touch sensors to provide one or more touch sensing regions, for example, on the bezel and/or back surface of the housing.

E-reading device 110 can also include one or more motion sensors 130 arranged to detect motion imparted thereto, such as by a user while reading or in accessing associated functionality. In general, the motion sensor(s) 130 may be selected from one or more of a number of motion recognition sensors, such as but not limited to, an accelerometer, a magnetometer, a gyroscope and a camera. Further still, motion sensor 130 may incorporate or apply some combination of the latter motion recognition sensors.

E-reading device 110 further includes motion gesture logic 137 to interpret user input motions as commands based on detection of the input motions by motion sensor(s) 130. For example, input motions performed on e-reading device 110 such as a tilt, a shake, a rotation, a swivel or partial rotation and an inversion may be detected via motion sensors 130 and interpreted as respective commands by motion gesture logic 137.

In some embodiments, the e-reading device 110 includes features for providing functionality related to displaying paginated content. The e-reading device 110 can include page transitioning logic 115, which enables the user to transition through paginated content. The e-reading device 110 can display pages from e-books, and enable the user to transition from one page state to another. In particular, an e-book can provide content that is rendered sequentially in pages, and the e-book can display page states in the form of single pages, multiple pages or portions thereof. Accordingly, a given page state can coincide with, for example, a single page, or two or more pages displayed at once. The page transitioning logic 115 can operate to enable the user to transition from a given page state to another page state In the specific example embodiment where a given page state coincides with a single page, for instance, each page state corresponding to one page of the digitally constructed series of pages paginated to comprise, in one embodiment, an e-book. In some implementations, the page transitioning logic 115 enables single page transitions, chapter transitions, or cluster transitions (multiple pages at one time).

The page transitioning logic 115 can be responsive to various kinds of interfaces and actions in order to enable page transitioning. In one implementation, the user can signal a page transition event to transition page states by, for example, interacting with the touch-sensing region of the display screen 116. For example, the user may swipe the surface of the display screen 116 in a particular direction (e.g., up, down, left, or right) to indicate a sequential direction of a page transition. In variations, the user can specify different kinds of page transitioning input (e.g., single page turns, multiple page turns, chapter turns, etc.) through different kinds of input. Additionally, the page turn input of the user can be provided with a magnitude to indicate a magnitude (e.g., number of pages) in the transition of the page state.

For example, a user can touch and hold the surface of the display screen 116 in order to cause a cluster or chapter page state transition, while a tap in the same region can effect a single page state transition (e.g., from one page to the next in sequence). In another example, a user can specify page turns of different kinds or magnitudes through single taps, sequenced taps or patterned taps on the touch sensing region of the display screen 116. Although discussed in context of "taps" herein, it is contemplated that a gesture action provided in sufficient proximity to touch sensors of display screen 116, without physically touching thereon, may also register as a "contact" with display screen 116, to accomplish a similar effect as a tap, and such embodiments are also encompassed by the description herein.

According to some embodiments, the e-reading device 110 includes display sensor logic 135 to detect and interpret user input or user input commands made through interaction with the touch sensors 138. By way of example, display sensor logic 135 can detect a user making contact with the touch-sensing region of the display screen 116, otherwise known as a touch event. More specifically, display sensor logic 135 can detect a touch events also referred to herein as a tap, an initial tap held in contact with display screen 116 for longer than some pre-defined threshold duration of time (otherwise known as a "long press" or a "long touch"), multiple taps performed either sequentially or generally simultaneously, swiping gesture actions made through user interaction with the touch sensing region of the display screen 116, or any combination of these gesture actions. Although referred to herein as a "touch" or a tap, it should be appreciated that in some design implementations, sufficient proximity to the screen surface, even without actual physical contact, may register a "contact" or a "touch event". Furthermore, display sensor logic 135 can interpret such interactions in a variety of ways. For example, each such interaction may be interpreted as a particular type of user input associated with a respective input command, execution of which may trigger a change in state of display 116.

The term "sustained touch" is also used herein and refers to a touch event that is held in sustained contact with display screen 116, during which sustained contact period the user or observer may take additional input actions, including gestures, on display screen 116 contemporaneously with the sustained contact. Thus a long touch is distinguishable from a sustained touch, in that the former only requires a touch event to be held for some pre-defined threshold duration of time, upon expiration of which an associated input command may be automatically triggered.

In one implementation, display sensor logic 135 implements operations to monitor for the user contacting or superimposing upon, using a finger, thumb or stylus, a surface of display 116 coinciding with a placement of one or more touch sensor components 138, that is, a touch event, and also detects and correlates a particular gesture (e.g., pinching, swiping, tapping, etc.) as a particular type of input or user action. Display sensor logic 135 may also sense directionality of a user gesture action so as to distinguish between, for example, leftward, rightward, upward, downward and diagonal swipes along a surface portion of display screen 116 for the purpose of associating respective input commands therewith.

Figure 2:
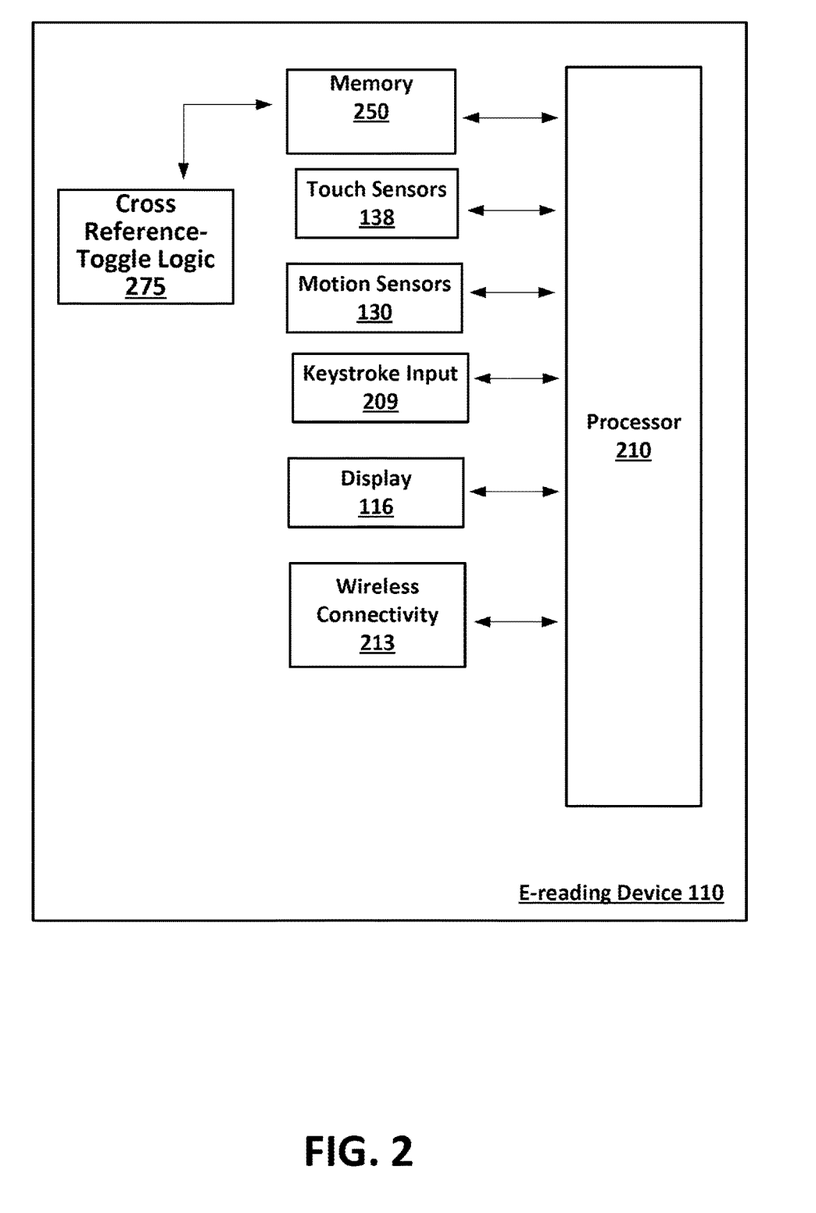
FIG. 2 illustrates an example architecture configuration of a computing device configured for operation in implementing an image centric mobile application, according to an embodiment.

FIG. 2 illustrates further detail of e-reading device 110 as described above with respect to FIG. 1, in an embodiment. E-reading device 110 further includes processor 210, a memory 250 storing instructions and logic pertaining at least to display sensor logic 135, cross reference and toggle logic 275, and page transition logic 115.

Processor 210 can implement functionality using the logic and instructions stored in memory 250. Additionally, in some implementations, processor 210 utilizes the network interface 220 to communicate with the network service 120 (see FIG. 1). More specifically, the e-reading device 110 can access the network service 120 to receive various kinds of resources (e.g., digital content items such as e-books, configuration files, account information), as well as to provide information (e.g., user account information, service requests etc.). For example, e-reading device 110 can receive application resources 221, such as e-books or media files, that the user elects to purchase or otherwise download via the network service 120. The application resources 221 that are downloaded onto the e-reading device 110 can be stored in memory 250.

In some implementations, display 116 can correspond to, for example, a liquid crystal display (LCD) or light emitting diode (LED) display that illuminates in order to provide content generated from processor 210. In some implementations, display 116 can be touch-sensitive. For example, in some embodiments, one or more of the touch sensor components 138 may be integrated with display 116. In other embodiments, the touch sensor components 138 may be provided (e.g., as a layer) above or below display 116 such that individual touch sensor components 138 track different regions of display 116. Further, in some variations, display 116 can correspond to an electronic paper type display, which mimics conventional paper in the manner in which content is displayed. Examples of such display technologies include electrophoretic displays, electro-wetting displays, and electro-fluidic displays.

Processor 210 can receive input from various sources, including touch sensor components 138, display 116, keystroke input 209 such as from a virtual or rendered keyboard, and other input mechanisms 299 (e.g., buttons, mouse, microphone, etc.). With reference to examples described herein, processor 210 can respond to input detected at the touch sensor components 138. In some embodiments, processor 210 responds to inputs from the touch sensor components 138 in order to facilitate or enhance e-book activities such as generating e-book content on display 116, performing page transitions of the displayed e-book content, powering off the device 110 and/or display 116, activating a screen saver, launching or closing an application, and/or otherwise altering a state of display 116.

In some embodiments, memory 250 may store display sensor logic 135 that monitors for user interactions detected through the touch sensor components 138, and further processes the user interactions as a particular input or type of input. In an alternative embodiment, display sensor logic module 135 may be integrated with the touch sensor components 138. For example, the touch sensor components 138 can be provided as a modular component that includes integrated circuits or other hardware logic, and such resources can provide some or all of display sensor logic 135. In variations, some or all of display sensor logic 135 may be implemented with processor 210 (which utilizes instructions stored in memory 250), or with an alternative processing resource.

E-reading device 110 further includes wireless connectivity subsystem 213, comprising a wireless communication receiver, a transmitter, and associated components, such as one or more embedded or internal antenna elements, local oscillators, and a processing module such as a digital signal processor (DSP) (not shown). As will be apparent to those skilled in the field of communications, the particular design of wireless connectivity subsystem 213 depends on the communication network in which computing device 110 is intended to operate, such as in accordance with Wi-Fi, Bluetooth, Near Field Communication (NFC) communication protocols, and the like.

The cross reference and toggle logic 275 can be implemented as a software module, comprising instructions stored in memory 250, on mobile computing device 110. One or more embodiments of the cross reference and toggle logic 275 described herein may be implemented using programmatic modules or components, a portion of a program, or software in conjunction with one or more hardware component(s) capable of performing one or more stated tasks or functions. As used herein, such module or component can exist on a hardware component independently of other modules or components. Alternatively, a module or component can be a shared element or process of other modules, programs or machines.

Display screen 116 of computing device 110 includes touch functionality whereby user input commands may be accomplished via gesture actions performed at display screen 116. In the context of reading digitally rendered pages comprising content of an e-book, for example, come common input commands accomplished via gesture actions received at display screen 116 may include, for example, page turns, making annotations, adjusting illumination levels or contrast of the device display screen, and re-sizing the font size of text in the content.

Overview of Toggle and Text Preview Windows

FIGS. 3a, 3b and 3c illustrate exemplary display operations for toggling a plurality of e-Book content, according to an embodiment. FIG. 3a shows an e-reading device 110 with a main text (book one) 350 in a primary portion of the display device. Book two, 360, book three 370 and book four 380 are disposed in secondary display portions off to the right hand of the display.

Embodiments include a cross-referencing annotation and toggle interface that enhances users' digital reading experience by making multiple e-book source texts (350, 360, 370 and 380) simultaneously available and easily navigable through a toggle interface activated from the home screen and controlled by intuitive touch and drag gestures, enabling readers to move effortlessly between different books (up to a maximum of four) for the purpose of cross-referencing, comparative analysis, linking to supplemental information etc.

In one embodiment, annotation links, such as annotation 399 that links book one 350 to book two 360, both cross-sources and inter-source 375, can be created by highlighting a specific term, sentence, image, word, or section of one text and thereby connect it to another source text, creating text preview bubbles as well as user-composed annotations. For example, book one 350 has an inter-source annotation, shown as highlighted portion 375.

In one embodiment, the text preview bubbles 399 and 390 (with hide (X) option 395) link to specific places within the secondary reference source or inter-textually within a given source text, depending on what option the user has selected via highlighting. For example, text preview bubble 390 links to a specific place in book four 380 and text preview bubble 399 links to a specific place in book two 360.

In one embodiment, a user may also create cross-source or inter-source textual links with their own annotations. A toggle interface on the display screen allows readers to quickly move back and forth between multiple reference sources/e-books.

In one embodiment, the text preview bubble shows a preview of the highlighted content from the secondary e-book chosen. In one embodiment, the books can be differentiated by color of the preview bubble. In another embodiment, the preview bubbles can be hidden or removed individually with hide button 395 or together with the hide all option 320. Likewise, the preview bubbles can be shown together with the show all option 310.

In one embodiment, a pop-up menu for searching additional texts to toggle between is provided. For example, to search an electronic library associated with the user, pop-up 330 can be selected. To search content not in the user's library, option 340 can be selected to search an online content provider, such as kobo.com.

FIG. 3b shows an example, of dragging the main text 350 from the primary position to a secondary position. In this example, dragging the main text 350 to the old position of book two 260 swaps the positions of the books where book two 360 is now in the primary position and the book one 350 is in a secondary position. In one embodiment, a user can switch the positioning by either dragging the content from one position to another or in one embodiment, a series of taps can perform the position swapping.

FIG. 3c illustrates an example of using the toggle features to enhance a reader's experience using the "gourmet French Book" shown as the primary book 350. Secondary books 330, 334, and 335 are provided in secondary positions and allow a user to quickly and easily refer to content of secondary books 333, 334 and 335. In one embodiment, a user can create links and notes between e-books, which can be saved for future reading.

Secondary book 333 has text preview bubble 336, secondary book 334 has text preview bubble 337 and secondary book 335 has text preview bubble 338. The text preview bubble shows a preview of the highlighted content from the secondary e-book chosen. In one embodiment, the books can be differentiated by color of the preview bubble.

Embodiments also include a network structure of relations between multiple texts, as well as within any given text, can be created in order to maximize, organize, and facilitate a multi-source reading experience, whether for academic purposes or for quick and easy cross-referencing. For example, in academic context, embodiments described herein allow for easy cross-textual analysis and comparison, as well as academic secondary references in order to better understand a primary text.

Figure 4:
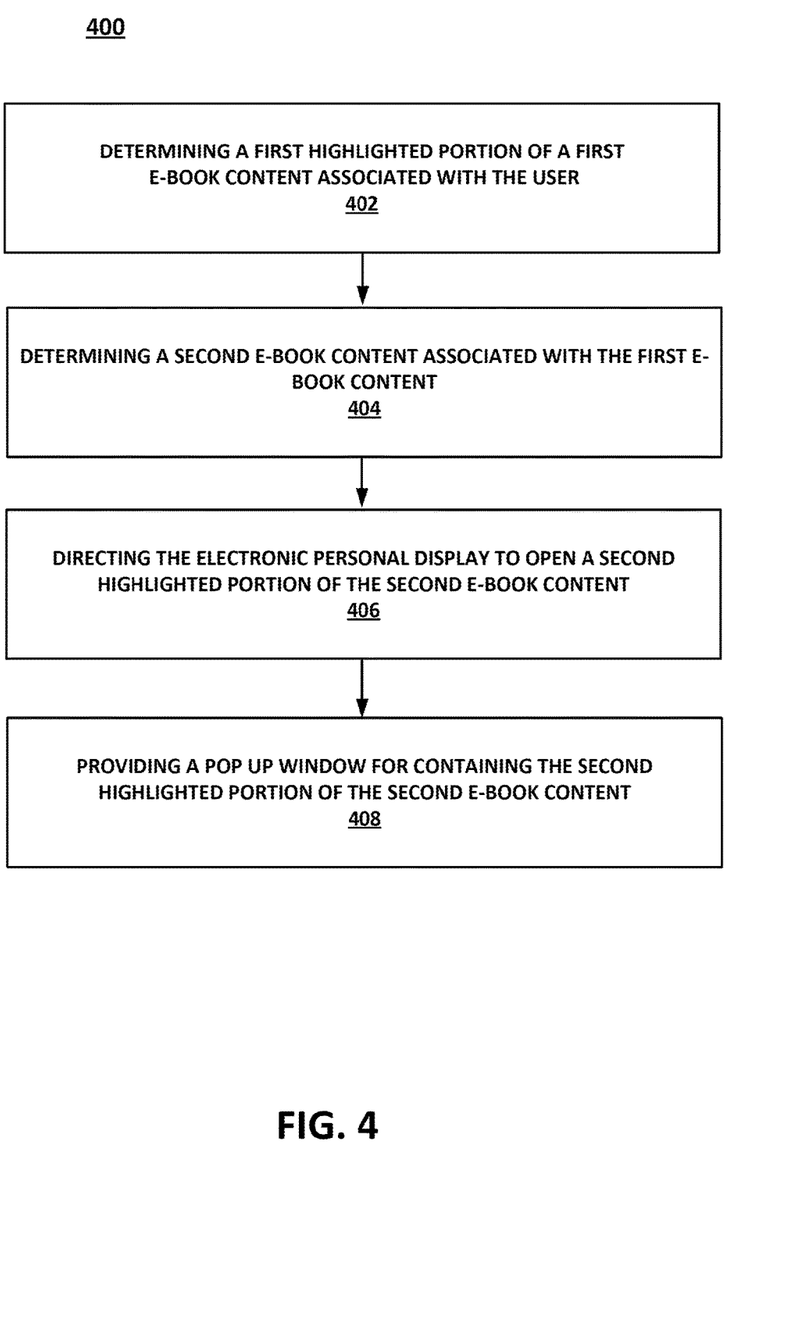
FIG. 4 illustrates a method of annotating e-Book content, according to an embodiment.

FIG. 4 illustrates a method 400 of annotating e-Book content, according to an embodiment. At 402, method 400 includes receiving a request to enter a toggle mode from a user. In one embodiment, the request to enter a toggle mode is performed by a swiping motion or any motion gesture on a touch sensitive display of an electronic reader.

At 404, method 400 includes determining a first e-book content associated with the user. In one embodiment, the first e-book content is displayed on a primary portion of a display of an electronic reader.

At 406, method 400 includes determining a second e-book content associated with the first e-book content. In one embodiment, the second e-book content is displayed on a primary portion of a display of an electronic reader. In one embodiment, the second e-book content is provided from the user's e-book library. In another embodiment, the second e-book content is provided from an e-book resource store.

At 408, method 400 includes directing the electronic personal display to open the second e-book content when initiating the toggle mode. In one embodiment, a user may make a purchase of the second e-book content and the content is then available on the electronic device.

In one embodiment, method 400 also includes moving the first e-book content from a primary portion of the electronic personal display to a secondary portion of the electronic personal display.

In one embodiment, method 400 also includes moving the second e-book content from a secondary portion of the electronic personal display to a primary portion of the electronic personal display.

In one embodiment, method 400 also includes making both the first e-book content and the second e-book content available for viewing simultaneously on the electronic personal display.

In one embodiment, method 400 includes determining a user drag the first e-book content from a primary portion of the electronic personal display to a secondary portion of the electronic personal display to enter the toggle mode from a user and automatically moving the second e-book content from the secondary portion of the electronic personal display to the primary portion of the electronic personal display.

In one embodiment, method 400 includes accessing a first portion of the first e-book content and automatically providing a second portion of the second e-book content that is associated with the first portion of the first e-book content.

In one embodiment, method 400 includes creating a link between the first portion of the first e-book content and the second portion of the second e-book content.

Figure 5:
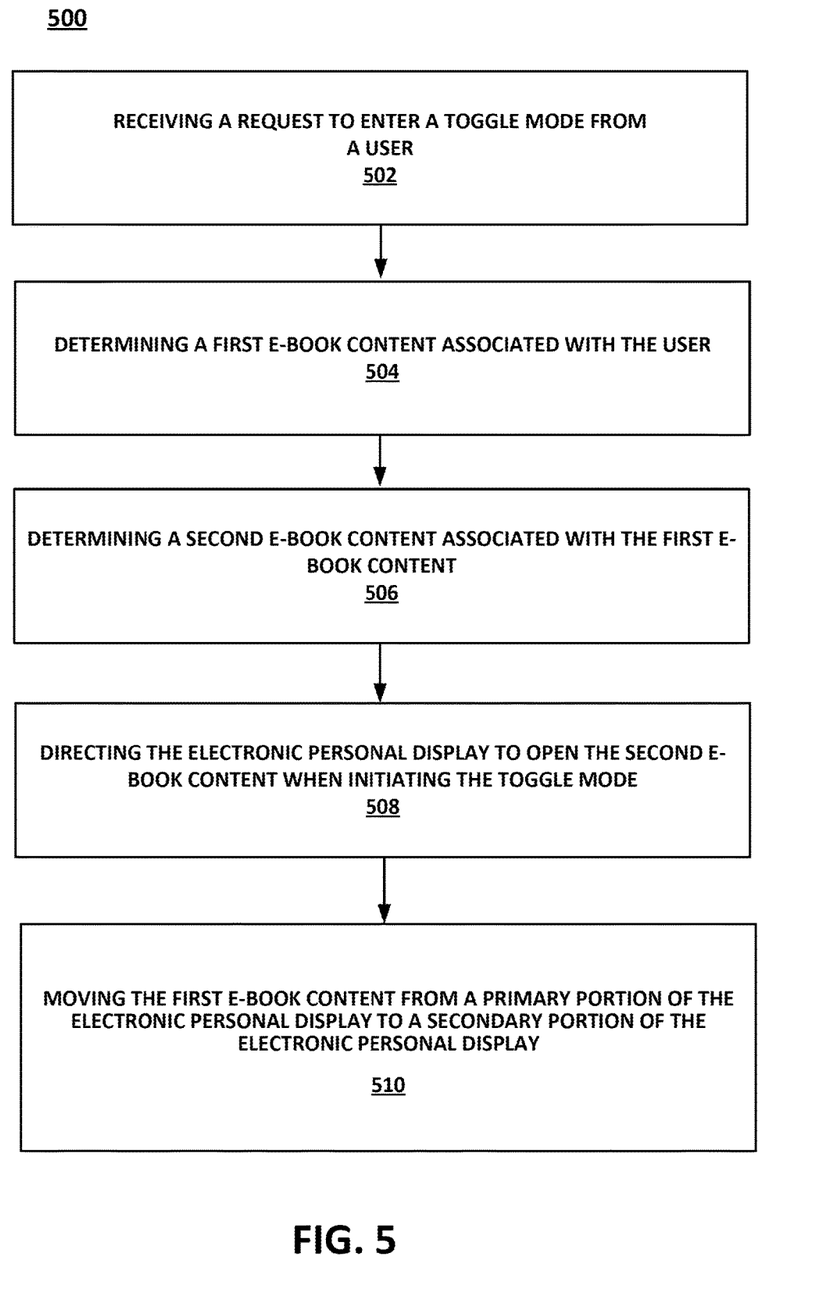
FIG. 5 illustrates a method of toggling a plurality of e-Book content, according to an embodiment.

FIG. 5 illustrates a method 500 for providing an annotation interface on an electronic personal display.

At 502, method 500 includes determining a first highlighted portion of a first e-book content associated with a user. In one embodiment, a user can swipe a portion of text of an e-Book to highlight the selected text. In one embodiment, the swiping of the text automatically highlights the text.

At 504, method 500 includes determining a second e-book content associated with the first e-book content. In one embodiment, a second e-book is selected based on the content of the highlighted portion of the first e-book.

At 506, method 500 includes directing the electronic personal display to open a second highlighted portion of said second e-book content. In step 506, a second portion of text from the second e-book is provided to the user and is associated with the first highlighted portion of the first e-book.

In one embodiment, method 500 also includes providing a pop up window for containing the second highlighted portion of the second e-book content.

In one embodiment, method 500 includes receiving a request to open the pop up window and moving the second e-book content from a secondary portion of the electronic personal display to a primary portion of the electronic personal display. In this way, a user can toggle between more than one e-book in a logical and intuitive manor.

In one embodiment, method 500 includes determining a third e-book content associated with the first e-book content and directing the electronic personal display to open a third highlighted portion of said third e-book content.

In one embodiment, method 500 includes making both the first, second and third e-book contents available for viewing simultaneously on the electronic personal display.

In one embodiment, method 500 includes creating a link between the first e-book content and the second e-book content.

In one embodiment, the first highlighted portion is displayed in a color that is different from the second highlighted portion.

Example Computer System Environment

Figure 6:
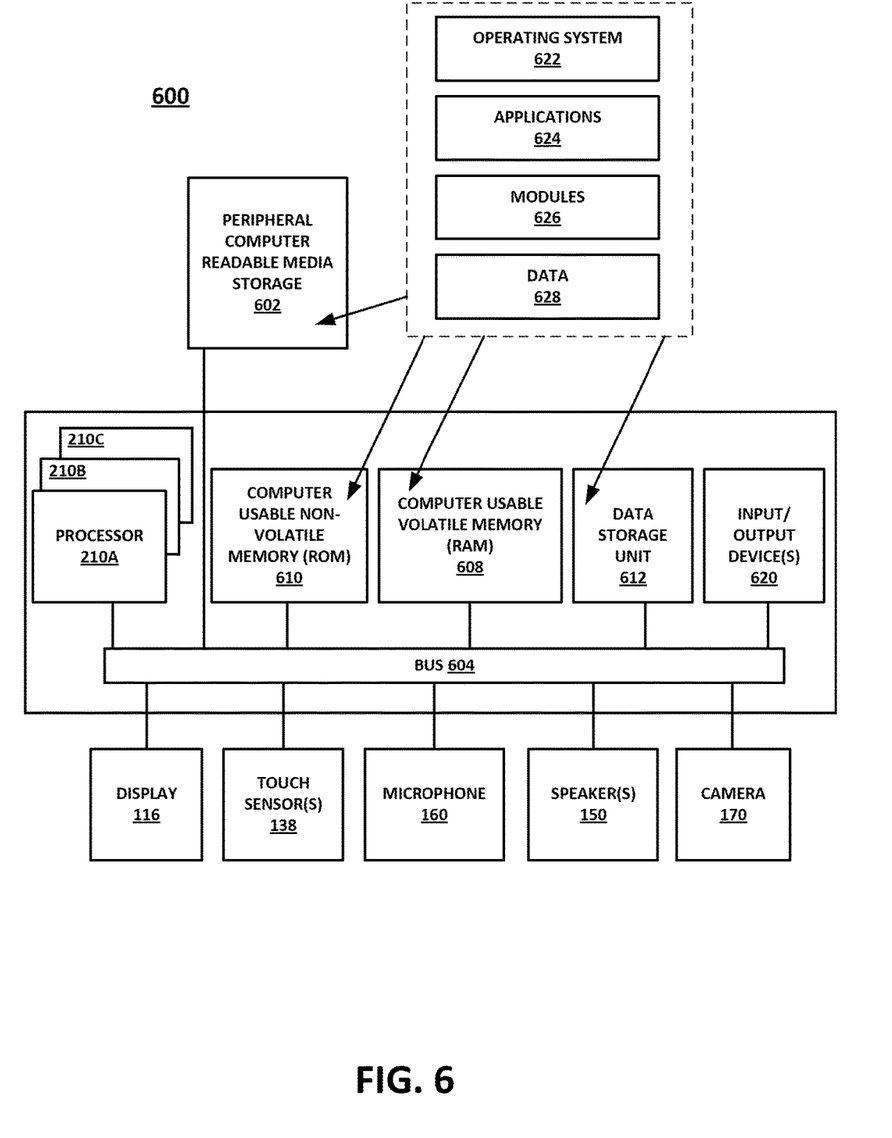
FIG. 6 illustrates an exemplary computer system for toggling e-Book content, according to an embodiment.

With reference now to FIG. 6, all or portions of some embodiments described herein are composed of computer-readable and computer-executable instructions that reside, for example, in computer-usable/computer-readable storage media of a computer system. That is, FIG. 6 illustrates one example of a type of computer (computer system 600) that can be used in accordance with or to implement various embodiments of an e-Reader, such as e-Reader 110, which are discussed herein. It is appreciated that computer system 600 of FIG. 6 is only an example and that embodiments as described herein can operate on or within a number of different computer systems.

System 600 of FIG. 6 includes an address/data bus 604 for communicating information, and a processor 210A coupled to bus 604 for processing information and instructions. As depicted in FIG. 6, system 600 is also well suited to a multi-processor environment in which a plurality of processors 210A, 210B, and 210C are present. Processors 210A, 210B, and 210C may be any of various types of microprocessors. For example, in some multi-processor embodiments, one of the multiple processors may be a touch sensing processor and/or one of the processors may be a display processor. Conversely, system 600 is also well suited to having a single processor such as, for example, processor 210A.

System 600 also includes data storage features such as a computer usable volatile memory 608, e.g., random access memory (RAM), coupled to bus 604 for storing information and instructions for processors 210A, 210B, and 210C. System 600 also includes computer usable non-volatile memory 610, e.g., read only memory (ROM), coupled to bus 604 for storing static information and instructions for processors 210A, 210B, and 210C. Also present in system 600 is a data storage unit 612 (e.g., a magnetic or optical disk and disk drive) coupled to bus 604 for storing information and instructions.

Computer system 600 of FIG. 6 is well adapted to having peripheral computer-readable storage media 602 such as, for example, a floppy disk, a compact disc, digital versatile disc, universal serial bus "flash" drive, removable memory card, and the like coupled thereto. In some embodiments, computer-readable storage media 602 may be coupled with computer system 600 (e.g., to bus 604) by insertion into removable a storage media slot.

System 600 also includes or couples with display 116 for visibly displaying information such as alphanumeric text and graphic images. In some embodiments, system 600 also includes or couples with one or more optional touch sensors 138 for communicating information, cursor control, gesture input, command selection, and/or other user input to processor 210A or one or more of the processors in a multi-processor embodiment. In some embodiments, system 600 also includes or couples with one or more optional speakers 150 for emitting audio output. In some embodiments, system 600 also includes or couples with an optional microphone 160 for receiving/capturing audio inputs. In some embodiments, system 600 also includes or couples with an optional digital camera 170 for receiving/capturing digital images as an input.

Optional touch sensor(s) 138 allows a user of computer system 600 (e.g., a user of an eReader of which computer system 600 is a part) to dynamically signal the movement of a visible symbol (cursor) on display 116 and indicate user selections of selectable items displayed. In some embodiment other implementations of a cursor control device and/or user input device may also be included to provide input to computer system 600, a variety of these are well known and include: trackballs, keypads, directional keys, and the like.

System 600 is also well suited to having a cursor directed or user input received by other means such as, for example, voice commands received via microphone 160. System 600 also includes an input/output (I/O) device 620 for coupling system 600 with external entities. For example, in one embodiment, I/O device 620 is a modem for enabling wired communications or modem and radio for enabling wireless communications between system 600 and an external device and/or external network such as, but not limited to, the Internet. I/O device 620 may include a short-range wireless radio such as a Bluetooth® radio, Wi-Fi radio (e.g., a radio compliant with Institute of Electrical and Electronics Engineers' (IEEE) 802.11 standards), or the like.

Referring still to FIG. 6, various other components are depicted for system 600. Specifically, when present, an operating system 622, applications 624, modules 626, and/or data 628 are shown as typically residing in one or some combination of computer usable volatile memory 608 (e.g., RAM), computer usable non-volatile memory 610 (e.g., ROM), and data storage unit 612. For example, modules 626 may include an application module for providing a toggle and or cross referencing platform for a user.

In some embodiments, all or portions of various embodiments described herein are stored, for example, as an application 624 and/or module 626 in memory locations within RAM 608, ROM 610, computer-readable storage media within data storage unit 612, peripheral computer-readable storage media 602, and/or other tangible computer readable storage media.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments.

What is claimed is:

1. A method for providing an interface on an electronic personal display, said method comprising:
   simultaneously displaying a first e-book having first content in a first screen portion of the interface and a second e-book having second content in a second screen portion of the interface, wherein the first content of the first e-book is different from the second content of the second e-book;
   receiving a first input that marks a first portion in the first content of the first e-book;
   receiving a second input that links the first portion with a second portion in the second content of the second e-book;
   establishing an association between the first portion in the first content with the second portion in the second content;
   generating a visual indicator at the second portion indicating the association between the first portion and the second portion;
   detecting a user gesture moving the first content from the first screen portion of the interface to the second screen portion of the interface;
   automatically relocating the first content from the first screen portion of the interface to the second screen portion of the interface; and
   automatically relocating the second content from the second screen portion of the interface to the first screen portion of the interface.

2. The method of claim 1, further comprising:
   detecting a user input accessing the first portion in the first content; and automatically displaying the second portion in the second content.

3. An electronic reader comprising:
a touch screen display including integrated touch sensors;
a memory configured to store e-book content; and
a processor coupled to the memory and configured to:
  simultaneously display on the touch screen display a first e-book having first content in a first screen portion of an interface and a second e-book having second content in a second screen portion of the interface, wherein the first content of the first e-book is different from the second content of the second e-book;
  receive, via the touch screen display, a first input that marks a first portion in the first content of the first e-book;
  receive, via the touch screen display, a second input that links the first portion with a second portion in the second content of the second e-book;
  establish an association between the first portion in the first content with the second portion in the second content;
  generate a visual indicator at the second portion indicating the association between the first portion and the second portion;
  detect a user gesture moving the first content from the first screen portion of the interface to the second screen portion of the interface;
  automatically relocate the first content from the first screen portion of the interface to the second screen portion of the interface; and
  automatically relocate the second content from the second screen portion of the interface to the first screen portion of the interface.

4. The electronic reader of claim 3, wherein the processor is further configured to:
  detect a user input accessing the first portion in the first content; and
  automatically displaying the second portion in the second content.

* * * * *